INVENTOR,
HERBERT HOOVER, JR.
BY
Lippincott & Metcalf
ATTORNEYS.

Fig. 4

Feb. 26, 1946.    H. HOOVER, JR    2,395,481
SEISMIC EXPLORATION SYSTEM
Filed July 24, 1939    3 Sheets-Sheet 3

INVENTOR,
HERBERT HOOVER, JR.
BY
Lippincott & Metcalf
ATTORNEYS.

Patented Feb. 26, 1946

2,395,481

UNITED STATES PATENT OFFICE 2,395,481

SEISMIC EXPLORATION SYSTEM

Herbert Hoover, Jr., Sierra Madre, Calif., assignor, by mesne assignments, to United Geophysical Company, Pasadena, Calif., a corporation of California Application July 24, 1939, Serial No. 286,171

2 Claims. (Cl. 177—352)

My invention relates to geophysical prospecting, and more particularly to circuits which control the sensitivity of seismic recording apparatus. My invention is applicable, as well, to any other signalling system in which a train of waves of varying intensity is received, and is especially applicable to systems utilizing wave-trains with sudden beginnings.

Among the objects of my invention are: to provide a method and means for varying the sensitivity of seismic recording apparatus during recording; to provide a method and means for providing intermediate sensitivity in recording the beginning of a wave-train; to provide a method and means for reducing the sensitivity in recording seismic waves shortly after the beginning of wave reception; to provide a method and means for increasing the sensitivity toward the end of the recording when the waves which have traveled the longest time are received; to provide a method and means for producing a quiet trace preceding the beginning of the wave-train; to provide a method and means for varying the sensitivity of an amplifier as a predetermined function of time; to provide a control unit which, once started, thereafter controls various operations in a predetermined time sequence; to provide a method and means for varying the sensitivity of an amplifier as a predetermined function of time and to change the time function at predetermined time intervals; to provide a means for indicating the variation of seismic wave amplifier sensitivity during recording; and to provide means for preventing cross feed between a plurality of amplifiers utilizing a common gain control unit.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawings:

Fig. 4 is a wiring diagram of one embodiment of my invention.

Figure 1:
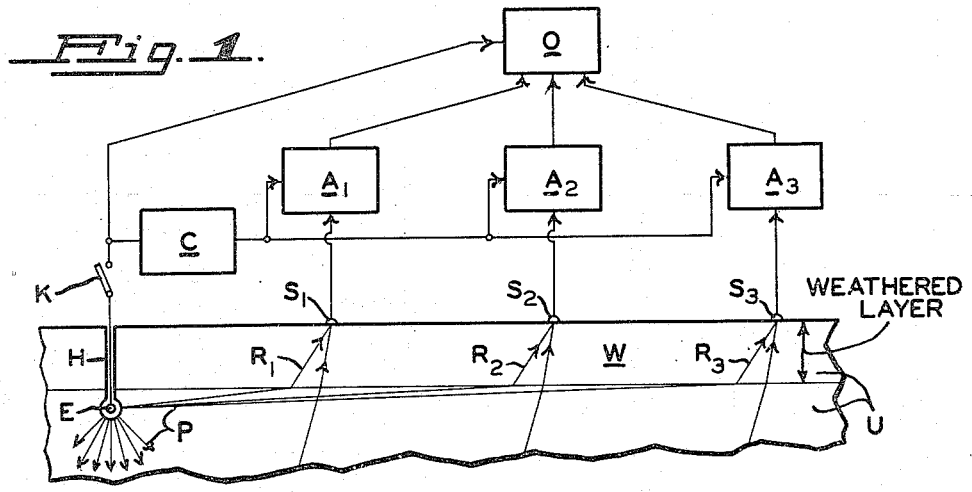
Fig. 1 is a schematic diagram illustrating the application of my invention to seismic prospecting.

In Fig. 1 I have illustrated schematically a set-up by means of which my invention may be applied to seismic prospecting. U represents a vertical cross section of the earth near its surface, and W represents the weathered layer.

In the practice of seismic geophysics, elastic waves are initiated at a source E, usually by the detonation of an explosive at the bottom of a shot hole H. When the waves originating at the source E, which are radiated in all directions as indicated by the lines P, encounter discontinuities in the earth they are deflected from straight paths, as by refraction or reflection. Some of the waves returning to the surface of the earth are received by receptors $S_1$, $S_2$, and $S_3$ which convert the received elastic waves into corresponding electrical waves. The electrical waves are amplified by amplifiers $A_1$, $A_2$, and $A_3$, and translated into visual form by multielement galvanometer O. The waves from the seismometers may be recorded as separate traces on photographic paper.

Figure 2:
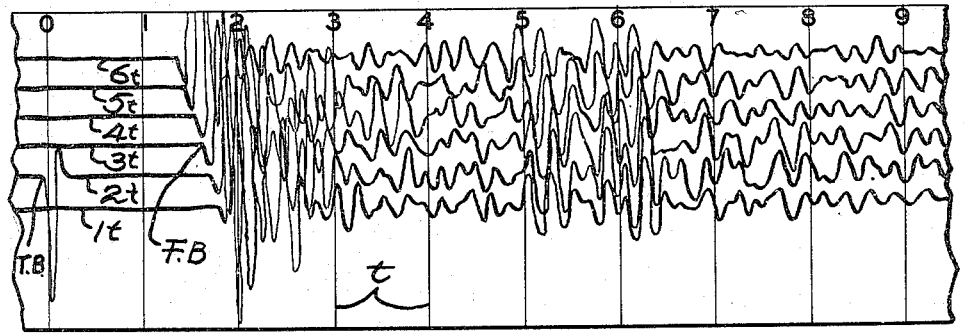
Fig. 2 is a reproduction of a field record used in illustrating the application of my invention to seismic prospecting.

Part of a record obtained by using six recording channels in accordance with the principles of my invention is shown in Fig. 2. For convenience the traces are referred to as $1t$ to $6t$, beginning from the bottom. Vertical timing lines are represented by $t$. T. B. on the second trace is the time break, which indicates the instant the wave source E is activated, and F. B. represents the first break for a wave-train reaching the receptor, the output of which is recorded on trace $3t$. Said first break determines the instant of arrival of the initial portion of the wave-train at said receptor.

It is to be noted that the first breaks on the various traces are sharp, and easily readable. The waves immediately following the first breaks are very large, in this case, in fact, so large on some traces that they cannot be studied easily. As is readily seen from the record the first wave to arrive is generally small compared with the waves immediately following and for this reason a rapid decrease in sensitivity is necessary to provide for recording the early portions of each trace following the first arrivals while providing for the recording of a sharp first break.

As can be seen, the average amplitude of the subsequently recorded waves on the rest of the record is favorable for the identification of corresponding waves appearing on the various traces.

It is also to be noticed that the traces are quiet, or free from noise, or disturbing microseisms, preceding the first breaks.

I achieve quiet traces and sharp first breaks by using intermediate sensitivity in my amplifiers during the early part of the recording. If the gain were low the first breaks would be small and therefore not so easily identified; if the gain were high microseisms or unrest would be reproduced at sizeable amplitude and would interfere with the recognition of first breaks.

To achieve easily readable waves shortly following the first breaks and thereafter, I reduce the amplifier sensitivity shortly after the first breaks are recorded and thereafter vary the sensitivity as a predetermined function of time in such a manner as to compensate for the varying amplitude of the received waves.

Actually, of course, the entire record of which Fig. 2 is a part extends to the right for a considerable length corresponding to a total recording time of four or five seconds or more and usually contains toward the end recorded waves of very low intensity.

I prefer to increase the sensitivity continuously toward the end of the record until the amplitude of the unrest completely masks any reflected waves that may be present. In this manner I am assured of obtaining a maximum amount of information from each shot.

In one preferred form of my invention the first breaks may be made sharp on each trace, and the average amplitude of the following waves as recorded on each trace maintained between limits suitable for study. I obtain this result by using as high gain as possible in my amplifiers while the first refracted waves are being received, without making the gain so high as to record earth unrest; and thereafter vary the gain of the amplifiers in accordance with the amplitude of the received waves.

In some areas sharp first breaks may be obtained by using low gain at the beginning of the recording. In such cases my apparatus may be readily adapted to provide a sensitivity vs. time function such as that represented by curve $aa$ of Fig. 3. In some cases the discharge of a condenser through a single resistor may provide all the gain control necessary, but this simple method is inadequate in many areas where its application inevitably results in excessive amplitudes during some portions of the recordings and small amplitudes in other portions of the recording. Usually it is not possible to compensate for the time-amplitude pattern of received seismic waves in such a simple manner. To obtain good records of waves from various depths below the surface in such a case it accordingly is necessary to make a number of records successively for each set-up using differing settings of the gain control device.

My invention overcomes these difficulties by providing a method for meeting a wide variety of conditions by making possible the changing of the time vs. sensitivity curve at predetermined spaced time intervals during the recording.

Figure 3:
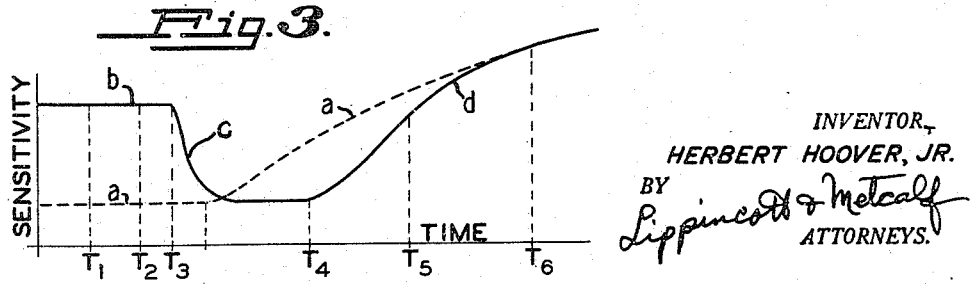
Fig. 3 is a graph useful in explaining the method of my invention.

In Fig. 3 curve $bcd$ represents graphically one manner in which I prefer to vary amplifier sensitivity during the recording. The instants at which the time break T. B. and the first break F. B. occur are represented by $T_1$ and $T_2$, respectively. $T_3$ and $T_4$ represent instants at which the time sensitivity function is changed.

Figure 4:
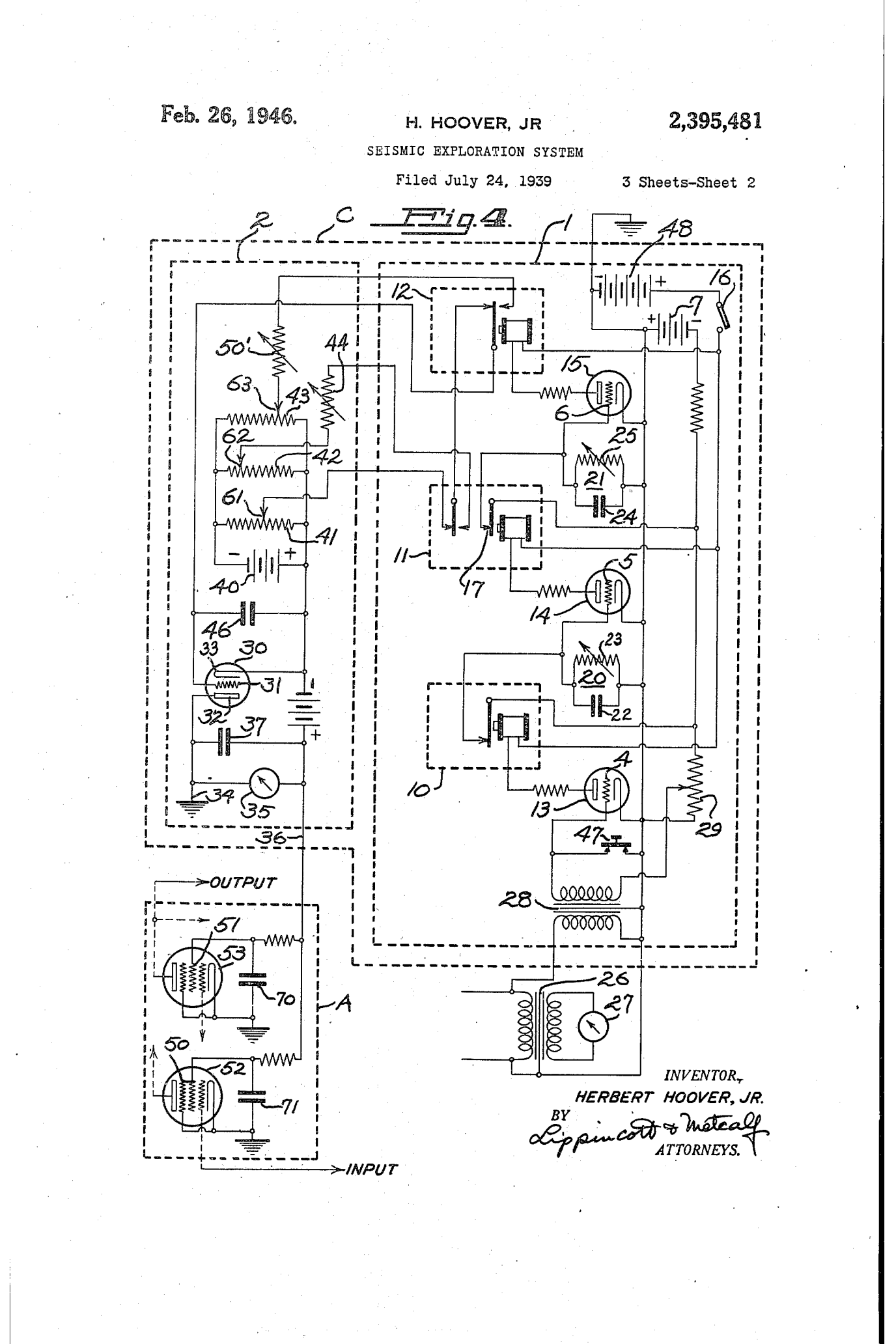

In Fig. 4 I have illustrated one particular preferred arrangement of apparatus which may be operated in accordance with my invention.

The control unit C has two main sections, timing unit 1 and sensitivity controlling device 2.

As illustrated, the timing unit 1 utilizes three thyratrons 13, 14, and 15, relays 10, 11, and 12, and time delay circuits 20 and 21. To set the timing unit 1 preparatory to operation, the key 16 is opened, thereby stopping the currents in the plate circuits of the thyratrons 13, 14, and 15 and causing the contacts of the relays 10, 11, and 12 to be closed in the left positions as shown. A push-button 47 normally open may be placed in the grid circuit of thyratron 13 for purposes hereinafter to be explained.

A signal derived from some suitable energy source, such as the current which detonates the explosive E, is applied to the primaries of transformers 26 and 28. A corresponding voltage appears in the secondary of transformers 26 and 28 and, if the connections are polarized properly, a positive potential is thereupon applied to the grid 4 of the thyratron 13. This positive potential is made large enough to fire said thyratron 13. Potentiometer 29 controls the sensitivity of thyratron 13.

At the instant current is applied to the primary 26 a corresponding signal may be applied to a galvanometer 27 which records the time break T. B. of Fig. 2 and occurs at the instant $T_1$ of Fig. 3.

When the thyratron 13 is fired, the relay 10 opens and the condenser 22 of the timing circuit 20 begins to discharge through the resistance 23 at a rate depending on the time constant of the timing circuit 20. At an instant $T_3$ of Fig. 3 the potential on the grid 5 swings in the positive direction enough to fire the thyratron 14, causing relay 11 to open in the left position and close in the right position.

When the pair of contacts 17 is opened, the condenser 24 discharges through the resistance 25 at a rate depending on the time constant of the timing circuit 21. Finally at the time $T_4$ the bias on the grid 6 swings in the positive direction enough to permit the thyratron 15 to fire, and the relay 12 is thereby caused to open in the left position and close in the right position.

A greater number of control stages than those shown may be used in the timing unit 1 to provide greater flexibility in the determination of the sensitivity vs. time curve. An unlimited variety of shapes of the sensitivity curve may thus be obtained by appropriate application of my invention.

The gain controlling device 2 may comprise a triode 30, with grid 31, plate 32, and cathode 33. In the plate circuit is a voltmeter 35 across which potentials appear in accordance with the plate current. Said voltmeter is conveniently placed in the recorder truck to aid an operator to visualize the gain control action of control unit C. As illustrated, the plate 32 is grounded at 34 and the potential of the cathode 33 is allowed to vary at a value above ground potential. The potential existing across the voltmeter 35 may be applied to the amplifier A in any suitable manner known to those skilled in the art to control the sensitivity of said amplifier A. In the example shown the control potential across voltmeter 35 supplies voltage to screens 50, 51 of vacuum tubes within amplifier A.

Since the current through voltmeter 35 is determined by the bias on grid 31, said bias accordingly determines the sensitivity of the amplifier A.

To vary the bias of grid 31 of the triode 30, I use a battery 40 across which are connected potentiometers 41, 42, and 43. For convenience the potentials between the cathode 33 and the sliding contacts 61, 62, and 63 may be referred to as the first, second, and third biases, respectively. When the control unit C has been set in a "ready" condition by opening the key 16 temporarily, as hereinabove explained the relays 11 and 12 are closed in the left position as shown in Fig. 4. In the "ready" conditions, therefore, the grid 31 is connected to the potentiometer 41 through contacts in the relays 11 and 12. The first bias is therefore the initial bias.

Now consider a typical sequence of operations which may occur during the recording of a train of seismic waves. Assume that the first, second, and third biases, hereinabove referred to, are respectively, of intermediate, high, and low values, as indicated by the positions of the respective contacts 61, 62, and 63 on the potentiometers 41, 42, and 43.

If an explosive is detonated at E at a time $T_1$ the timing unit 1 is actuated, the first break F. B. is recorded at time $T_2$ while the sensitivity is a steady intermediate value indicated by section $b$ of the solid curve in Fig. 3. At time $T_3$, shortly after recording the first break, relay 11 opens in the left position and closes in the right position. Current from battery 40 begins to flow through resistor 44 charging condenser 46, thereby increasing the bias on grid 31 and decreasing the sensitivity of amplifier A as a function of time such as along section $c$ of the solid curve in Fig. 3.

At time $T_4$ relay 12 opens in the left position and closes in the right position. Condenser 46 discharges through resistor 50' and 43, and the sensitivity of amplifier A increases along a curve such as $d$ of Fig. 3. The values of resistances 44 and 50 and condenser 46 may be adjusted to vary the shape of the sensitivity curve of Fig. 3.

In practice I generally make condenser 37 large to prevent sharp pulses from being suddenly applied to screens of tubes 52 and 53. Condenser 37 also serves to decouple a plurality of amplifiers using a common control circuit and thereby prevents crossfeed. Screen grid condensers 70 and 71 in various amplifiers using a common control circuit also aid in isolating the amplifiers from each other.

By means of other relays operated in the manner hereinabove explained, further changes in the amplifier sensitivity as a predetermined function of time may be made at later times such as $T_5$ and $T_6$.

In the form of my invention illustrated in Fig. 1, the sensitivity of all amplifiers is governed by a common control unit and the operation of said control unit is initiated simultaneously with the detonation of an explosive at E. But other forms of my invention may be adopted.

For instance, the operator of the seismic wave recording apparatus may initiate the operation of the control unit C manually by closing push-button 47 at the proper time. By watching the galvanometer spots through a window in oscillograph O, he may observe the arrival of the first waves and close push-button 47 immediately thereafter. In some cases he may close push-button 47 shortly after closing firing key K by properly timing the operation.

Figure 5:
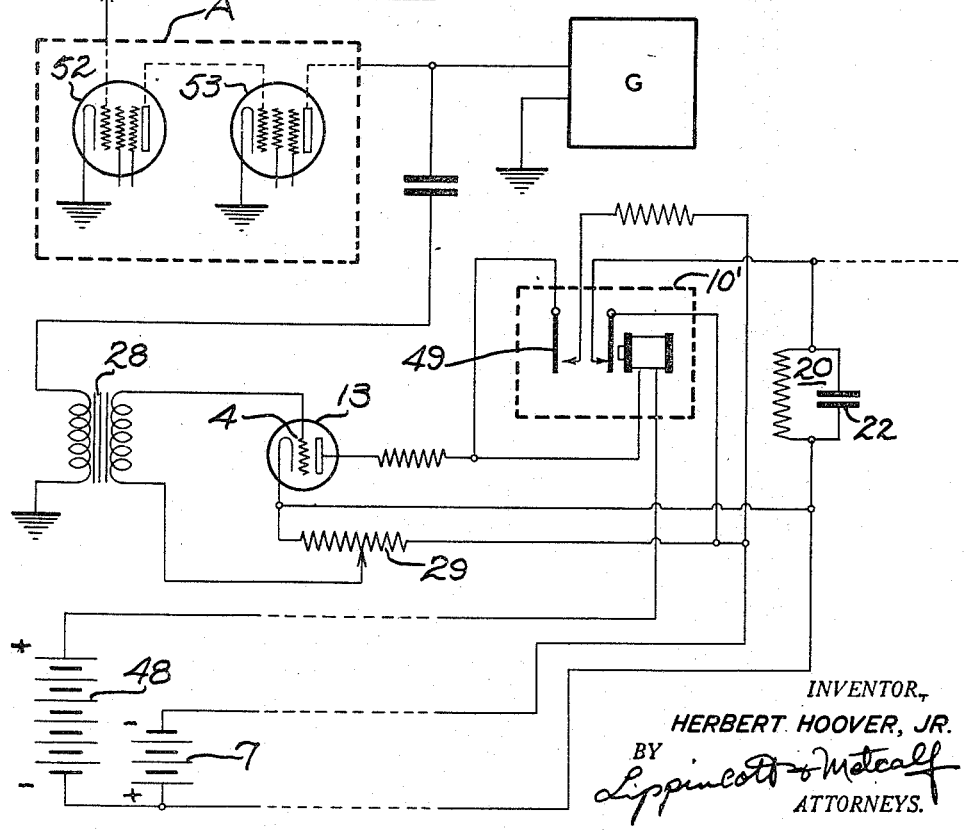
Fig. 5 illustrates another embodiment of my invention.

Another form of my invention is illustrated in Fig. 5. This represents a modification of the circuit of Fig. 4 and only so much of the circuit is shown as necessary to explain the operation and indicate the differences between Figs. 4 and 5.

In Fig. 5 the output of amplifier A is applied to a vacuum tube 13 through transformer 28, and a sticking relay 10' is used in the plate circuit of said tube 13.

When the first waves arrive at the receptor connected to the input of amplifier A, corresponding electrical waves appear in the output of said amplifier. Part of said output is applied to a recording galvanometer G and part is applied to tube 13, causing said tube to close relay 10'. When relay 10' is closed condenser 22 in timing circuit 20 discharges and relays 11 and 12 are closed in turn as hereinabove explained. In the case of Fig. 5, however, the extra pair of contacts 49 are closed and the potential of battery 48 is applied to the coil of relay 10' to hold it closed during the remaining time while control unit C varies the sensitivity of amplifier A.

Figure 6:
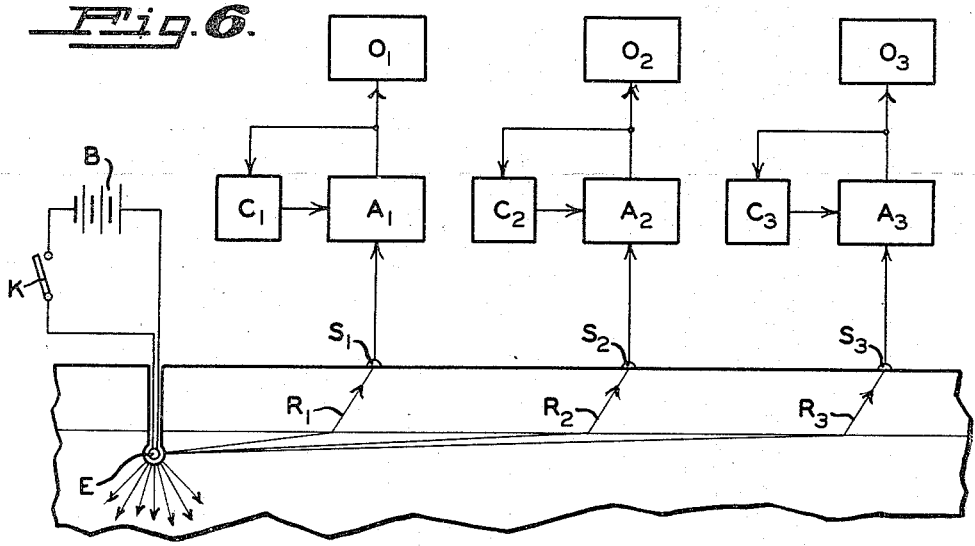
Fig. 6 illustrates still another embodiment of my invention.

Fig. 6 is a schematic diagram of the method of Fig. 5 as I apply it to a plurality of amplifier channels separately. Here receptors $S_1$, $S_2$, and $S_3$ are connected to their respective amplifiers $A_1$, $A_2$, and $A_3$ and their respective recorders $O_1$, $O_2$, and $O_3$. Amplifiers $A_1$, $A_2$, and $A_3$ are each controlled by separate units $C_1$, $C_2$, and $C_3$ in the manner described in connection with Fig. 5. When separate control units are applied to each recording channel I prefer to use ordinary vacuum tubes at 13, 14, and 15 to cut down on the filament drain required and to provide a high impedance across the secondary of transformer 28.

Initiation of the sensitivity control operation by the first waves to arrive at the respective receptors facilitates obtaining sharp first breaks on each trace even though the receptors be spaced several hundreds or thousands of feet apart and the amplifiers and recorders are established at the respective receiver stations.

Thus it is seen that I may initiate the operation of the sensitivity control unit manually, or automatically by the first arrivals or by energy derived directly from the wave source, and I may apply such control to all amplifier units separately or jointly.

From the foregoing description it is clear that I have provided a method for obtaining sharp first breaks in translating seismic wave-trains and at the same time have supplied a method for controlling the sensitivity of the receiving apparatus in a manner which compensates for variations of the amplitudes of waves following the first breaks.

I claim:

1. In seismic prospecting, the improvement which comprises the steps of receiving a train of seismic waves, converting the received seismic waves into corresponding electrical waves, amplifying the electrical waves, utilizing a predetermined amplification factor for the initial portion of the electrical wave train, shortly thereafter reducing the amplification factor of the electrical waves to a value which is low relative to said predetermined amplification factor, and then increasing the amplification factor of the electrical waves as a function of the time elapsed from a predetermined instant independently of the amplitude of the received waves, ultimately increasing the amplification factor toward the end of the wave train reception to a higher value than that utilized in amplifying the initial portion of the wave train, and recording the amplified electrical waves.

2. In seismic prospecting, the improvement which comprises the steps of receiving a train of seismic waves, converting the received seismic waves into corresponding electrical waves, amplifying the electrical waves, utilizing a predetermined amplification factor for the first portion of the electrical wave train, shortly thereafter reducing the amplification factor of the electrical waves to a value which is low relative to said predetermined amplification factor, and then increasing the amplification factor of the electrical waves as a function of the time elapsed from a predetermined instant ultimately increasing the amplification factor toward the end of the wave train reception to a higher value than the amplification factor utilized in connection with the initial portion of the wave train, and recording the amplified electrical waves.

HERBERT HOOVER, Jr.